United States Patent
Ogawa et al.

(10) Patent No.: US 11,323,284 B2
(45) Date of Patent: May 3, 2022

(54) COMMUNICATION APPARATUS, CAR INTEGRATED MANAGEMENT SYSTEM, AND ROUTING TABLE UPDATE METHOD

(71) Applicant: MITSUBISHI ELECTRIC CORPORATION, Tokyo (JP)

(72) Inventors: Yuji Ogawa, Tokyo (JP); Yuji Hamada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 391 days.

(21) Appl. No.: 15/304,959

(22) PCT Filed: Apr. 21, 2014

(86) PCT No.: PCT/JP2014/061189
§ 371 (c)(1),
(2) Date: Oct. 18, 2016

(87) PCT Pub. No.: WO2015/162672
PCT Pub. Date: Oct. 29, 2015

(65) Prior Publication Data
US 2017/0187545 A1 Jun. 29, 2017

(51) Int. Cl.
*H04L 12/00* (2006.01)
*H04L 12/28* (2006.01)
(Continued)

(52) U.S. Cl.
CPC ...... *H04L 12/2881* (2013.01); *B61L 15/0027* (2013.01); *B61L 15/0036* (2013.01);
(Continued)

(58) Field of Classification Search
CPC ... H04W 52/365; H04W 16/02; H04W 52/34; H04W 72/04; H04W 72/042; H04W 72/0453
See application file for complete search history.

(56) References Cited

U.S. PATENT DOCUMENTS 8,037,204 B2 10/2011 Breton et al.
8,743,873 B2 6/2014 Shigeeda et al.
(Continued)

FOREIGN PATENT DOCUMENTS

CN 104243536 A 12/2014
EP 2 383 162 A1 11/2011
(Continued)

OTHER PUBLICATIONS

"A Distributed Comparison Algorithm for Train Inauguration Protocols over Ethernet", E-Product E-Service and E-Entertainment (ICEEE), 2010 International Conference on, IEEE.*
(Continued)

*Primary Examiner* — Abdelillah Elmejjarmi
(74) *Attorney, Agent, or Firm* — Buchanan Ingersoll & Rooney PC (57) ABSTRACT

A car integrated management system has a plurality of communication apparatuses, each including: an extraction unit to extract entries from a table; an address unit to generate a destination address of a packet, using information to identify a subnet connected to each of the communication apparatuses, and to generate a next hop address that indicates an address of a transfer destination to which the packet is to be transferred, using information to identify each of the communication apparatuses, the subnet identification information and the communication apparatus identification information being included in entry extracted by the extraction unit; an acquisition unit to acquire information about an IP port to be used for sending the packet to a communication apparatus at the next hop address; and an entry addition unit to add information about the destination address, the next hop address, and the IP port to a routing table.

24 Claims, 4 Drawing Sheets

(51) Int. Cl.

| | | |
|---|---|---|
| *B61L 15/00* | (2006.01) | |
| *H04B 3/60* | (2006.01) | |
| *H04L 12/46* | (2006.01) | |
| *H04L 49/25* | (2022.01) | |
| *H04L 49/351* | (2022.01) | |
| *H04L 67/12* | (2022.01) | |

(52) U.S. Cl.
CPC ....... *B61L 15/0072* (2013.01); *B61L 15/0081* (2013.01); *H04B 3/60* (2013.01); *H04L 12/2801* (2013.01); *H04L 12/2858* (2013.01); *H04L 12/4625* (2013.01); *H04L 49/25* (2013.01); *H04L 49/351* (2013.01); *H04L 67/12* (2013.01)

(56) References Cited

U.S. PATENT DOCUMENTS

| | | | | |
|---|---|---|---|---|
| 2005/0001471 | A1* | 7/2005 | Moleyar | H04L 29/12009 370/412 |
| 2005/0147111 | A1* | 7/2005 | Moleyar | H04L 29/12839 370/412 |
| 2005/0286455 | A1* | 12/2005 | Fernandes | H04L 47/24 370/312 |
| 2006/0180709 | A1 | 8/2006 | Breton et al. | |
| 2010/0020723 | A1 | 1/2010 | Tatsumi et al. | |
| 2010/0302974 | A1 | 12/2010 | Niiyama et al. | |
| 2011/0051652 | A1* | 3/2011 | Kubo | H04W 40/30 370/315 |
| 2011/0164508 | A1 | 7/2011 | Arai et al. | |
| 2011/0286464 | A1 | 11/2011 | Shigeeda et al. | |
| 2012/0158942 | A1* | 6/2012 | Kalusivalingam | H04L 45/04 709/224 |
| 2013/0058253 | A1 | 3/2013 | Maruta et al. | |
| 2013/0242856 | A1* | 9/2013 | Foxworthy | H04B 7/18541 370/316 |
| 2014/0379817 | A1* | 12/2014 | Logue | H04L 67/147 709/206 |

FOREIGN PATENT DOCUMENTS

| | | | | |
|---|---|---|---|---|
| JP | 2006-005607 | A | | 1/2006 |
| JP | 2008-042302 | A | | 2/2008 |
| JP | 2011-010279 | A | | 1/2011 |
| JP | 2011-142479 | A | | 7/2011 |
| JP | 2011-205582 | A | | 10/2011 |
| JP | 2012-105164 | A | | 5/2012 |
| JP | 2013059210 | A * | 1/2013 | ............. B60L 15/42 |
| JP | 2013-042370 | A | | 2/2013 |
| WO | WO2009000544 | A1 * | 12/2008 | ............. H04L 12/40 |
| WO | WO2009000544 | A1 * | 12/2008 | ............. H04L 12/40 |
| WO | WO 2009/072313 | A1 | | 6/2009 |

OTHER PUBLICATIONS

"A Distributed Comparison Algorithm for Train Inauguration Protocols over Ethernet", IEEE, 2010.*

"A Distributed Comparison Algorithm for Train Inauguration Protocols over Ethernet", E-Product E-Service and E-Entertainment (IEEE), 2010 International Conference on, IEEE.*

Extended European Search Report dated Jul. 24, 2017, issued by the European Patent Office in corresponding European Application No. 14890347.9. (12 pages).

Zeng et al., "A Distributed Comparison Algorithm for Train Inauguration Protocols over Ethernet", E-Product E-Service and E-Entertainment (ICEEE), 2010 International Conference on, IEEE, Piscataway, NJ, USA, Nov. 7, 2010, pp. 1-5.

Office Action dated Feb. 22, 2019, by the India Patent Office in corresponding India Patent Application No. 201647035829. (7 pages).

International Search Report (PCT/ISA/210) dated May 20, 2014, by the Japanese Patent Office as the International Searching Authority for International Application No. PCT/JP2014/061189.

Written Opinion (PCT/ISA/237) dated May 20, 2014, by the Japanese Patent Office as the International Searching Authority for International Application No. PCT/JP2014/061189.

Japanese Office Action dated Oct. 13, 2015 for Application No. 2015-538195 (with English translation, 3 pages).

Song Zhixiong et al., "Semi-Physical Simulation Platform Research Based on Ethernet Train Backbone Network", Information Technology Journal, vol. 13, No. 7, pp. 1309-1315; Mar. 20, 2014.

* cited by examiner

| ENTRY | CstUUID | CNid | subnetid | ETBNid | CstOrientation |
|---|---|---|---|---|---|
| 0 | ... | ... | 5 | 05 | ... |
| 1 | ... | ... | 6 | 06 | ... |
| 2 | ... | ... | 7 | 07 | ... |
| 3 | ... | ... | 8 | 07 | ... |

FIG.5

| ENTRY | DESTINATION ADDRESS | NEXT HOP ADDRESS | INTERFACE |
|---|---|---|---|
| ... | ... | ... | ... |
| xx1 | 10.129.128.0/18 | 10.128.0.6/18 | #1 |
| xx2 | 10.129.192.0/18 | 10.128.0.7/18 | #1 |
| xx3 | 10.130.0.0/18 | 10.128.0.8/18 | #1 |

COMMUNICATION APPARATUS, CAR INTEGRATED MANAGEMENT SYSTEM, AND ROUTING TABLE UPDATE METHOD

FIELD

The present invention relates to a communication apparatus, a car integrated management system, and a routing table update method.

BACKGROUND

Conventionally, in a train formation composed of a plurality of cars, communication is performed between the cars. Train formations are generally not fixed, but may be subjected to a split or merger. When a split or merger for a train formation is performed, communication target devices are also changed. In relation to such a case, for example, Patent Literature 1 listed below discloses a technology for translating IP (Internet Protocol) addresses, based on a routing table, between a static IP address for wired LAN (Local Area Network) and a static IP address for wireless LAN.

Further, when a merger for a train formation is performed by use of a TCMS (Train Control and Monitoring System), if a routing function conforming to ETBN (Ethernet (registered trademark) Train Backbone Network) is used, an entry addressed to a merger target formation subnet cannot be added to a routing table conforming to ETBN. In this case, the routing table can be updated by use of a routing protocol, such as OSPF (Open Shortest Pass Fast).

CITATION LIST

Patent Literature

Patent Literature 1: Japanese Patent Application Laid-open No. 2011-10279

SUMMARY

Technical Problem

However, OSPF is complicated in protocol. Accordingly, in a communication apparatus, there is a problem in that a resource, such as a CPU (Central Processing Unit), is considerably consumed. Further, OSPF is not one created on the premise that an alteration is frequently performed, and so there is a problem in that it takes a long time to converge.

The present invention has been made in view of the above, and an object of the present invention is to provide a communication apparatus, a car integrated management system, and a routing table update method, which allow a TCMS to easily update a routing table conforming to ETBN.

Solution to Problem

To solve the above described problem and achieve the object, a communication apparatus for a car integrated management system including a plurality of communication apparatuses connected to each other according to the present invention comprises: an entry extraction unit configured to extract information of each entry from a TND (Train Network Directory) table; an address generation unit; an IP port information acquisition unit configured to acquire information about an IP (Internet Protocol) port to be used for sending the packet to a communication apparatus at the next hop address; and an entry addition unit configured to add information about the destination address the next hop address, and the IP port to a routing table. The address generation unit is configured to generate: a destination address as a delivery destination of a packet, by use of subnet identification information for identifying a subnet connected to each of the communication apparatuses; and a next hop address that indicates an address of a transfer destination communication apparatus to which the packet is to be transferred from its own apparatus, by use of communication apparatus identification information for Identifying each of the communication apparatuses. The subnet identification information and the communication apparatus identification information are included in entry information extracted by the entry extraction unit.

Advantageous Effects of Invention

According to the present invention there is provided an effect capable of allowing a TCMS to easily update a routing table of the ETBN.

DESCRIPTION OF EMBODIMENTS

An exemplary embodiment of a communication apparatus, a car integrated management system, and a routing table update method according to the present invention will be explained below in detail with reference to the accompanying drawings. The present invention is not limited to the following embodiment.

Embodiment

Figure 1:
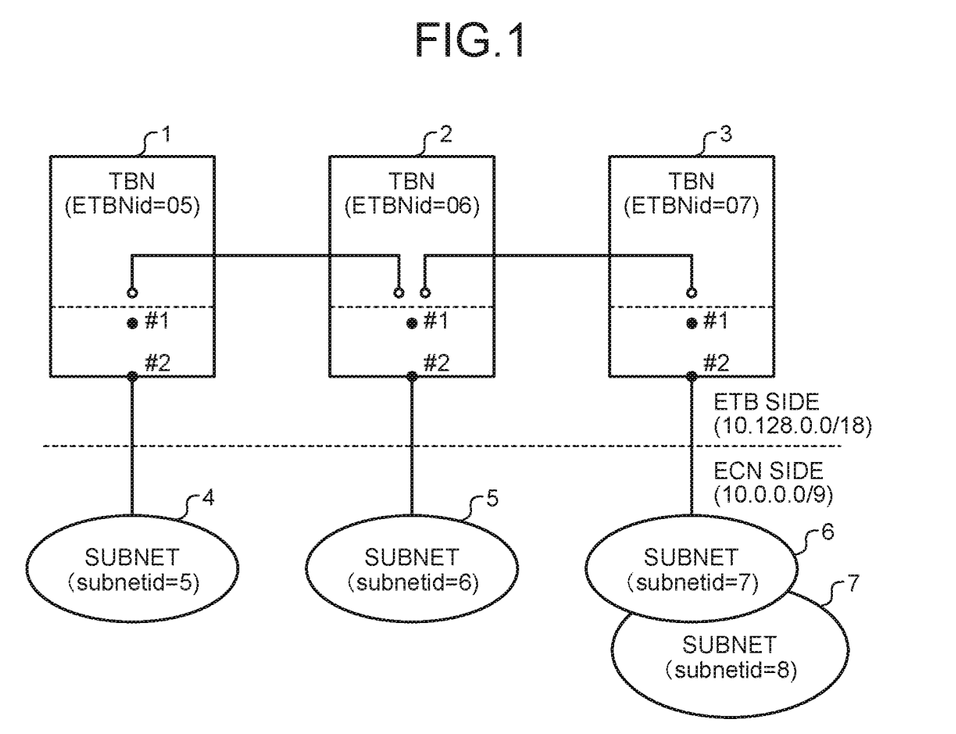
FIG. 1 is a view illustrating a configuration example of a car integrated management system.

FIG. 1 is a view illustrating a configuration example of a car integrated management system according to this embodiment. Here, it is assumed that this system is a TCMS. The car integrated management system includes TBNs (Train Backbone Node) 1, 2, and 3, each of which is a communication apparatus. The TBN 1 is connected to the network of a subnet 4, the TBN 2 is connected to the network of a subnet 5, and the TBN 3 is connected to the networks of subnets 6 and 7. FIG. 1 illustrates a state where one or more subnets are formed such that one train car or one train formation is equipped with one TBN, and where three train cars or three train formations are merged. In FIG. 1, the upper side corresponds to an ETB (Ethernet Train Backbones) side, and the lower side corresponds to an ECN (Ethernet Consist Network) side.

Each of the subnets 4 to 7 is configured to perform Ethernet (registered trademark) communication, and one or more end devices (terminals) are connected in one subnet. After merger, in the car integrated management system illustrated in FIG. 1, a terminal in one subnet and a terminal in another subnet are regarded as being on the same Ethernet and a packet can be transmitted and received between them.

In each of the TBNs 1 to 3, a black circle indicates an IP port. Each of the TBNs 1 to 3 is connected to another TBN via an IP port #1, and is connected to the subnet side via an IP port #2. Here, in FIG. 1, the car integrated management system includes the three TBNs (1 to 3), but this is a mere example, and the system may include two, four, or more TBNs.

Figure 2:
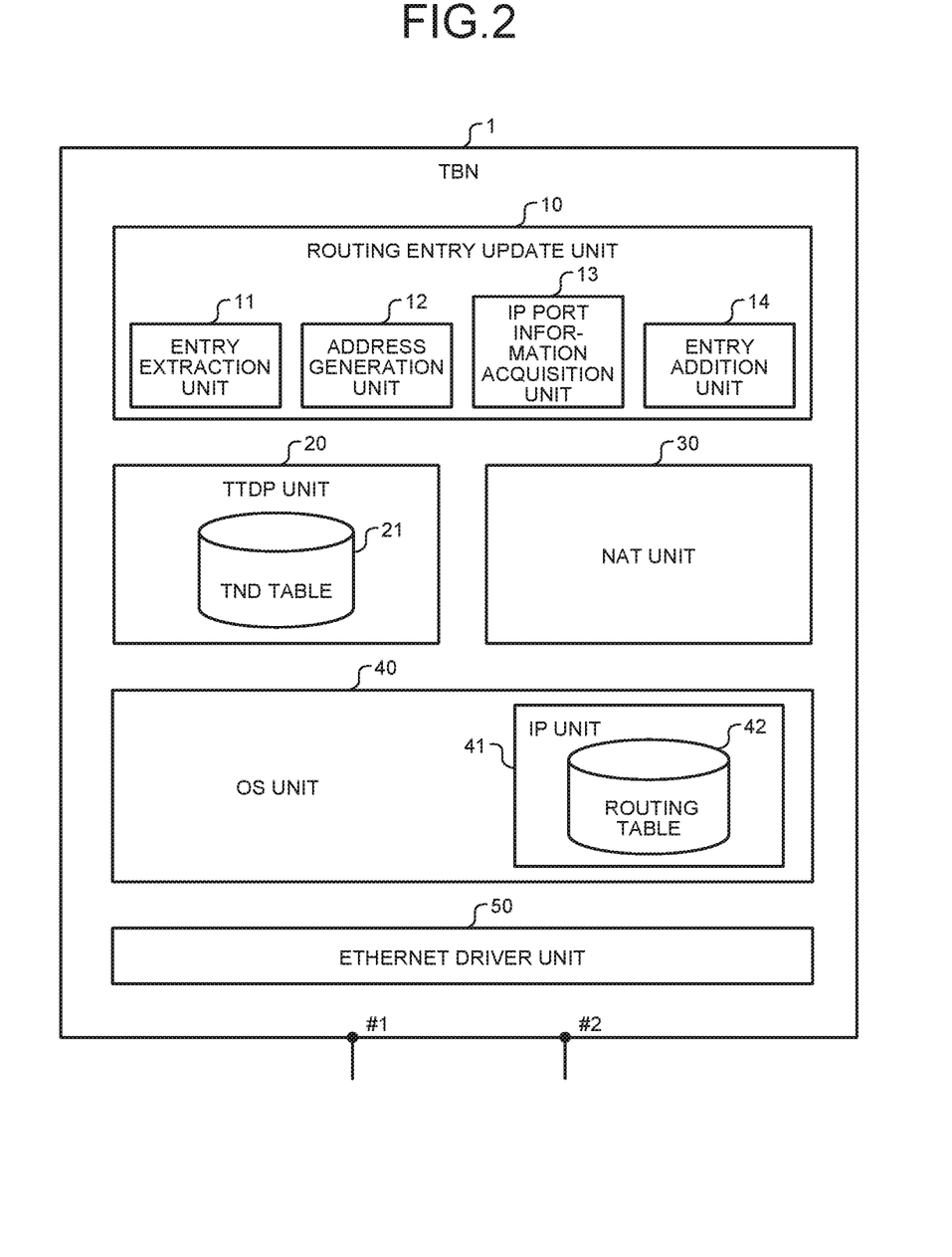
FIG. 2 is a view illustrating a configuration example of a TBN.

Next, an explanation will be given of the configuration of each of the TBNs 1 to 3. FIG. 2 is a view illustrating a configuration example of the TBN 1. Hereinafter, the TBN 1 will be explained as an example, but the TBNs 1 to 3 are assumed to have the same configuration. The TBN 1 includes a routing entry update unit 10, a TTDP (Train Topology Discovery Protocol) unit 20, a NAT (Network Address Translation) unit 30, an OS (Operating System) unit 40, and an Ethernet driver unit 50.

The routing entry update unit 10 performs a process of updating a routing table 42 by adding an entry to the routing table 42 when the TBN 1 of its own apparatus is merged with another TBN. The routing table 42 is included in an IP unit 41 of the OS unit 40 as will be described later.

The routing entry update unit 10 includes: an entry extraction unit 11 for extracting information described in each entry from a TND (Train Network Directory) table 21 included in the TTDP unit 20 as described later; an address generation unit 12 for generating a destination address and a next hop address to be written into the routing table 42, by use of information described in an entry extracted by the entry extraction unit 11; an IP port information acquisition unit 13 for acquiring information, from the OS unit 40, about an IP port connected to a TBN as a transfer destination of a packet; and an entry addition unit 14 for adding, to the routing table 42, information about a destination address and a next hop address generated by the address generation unit 12, and information about an IP port acquired by the IP port information acquisition unit 13.

The TTDP unit 20 includes a TND table 21. When the TBN 1 of its own apparatus is merged with another TBN, the TTDP unit 20 updates the TND table 21 by use of a TTDP protocol process, and thereby adds information about this other TBN to the TND table 21. When a plurality of TBNs are merged, each of the TBNs performs the same protocol process in the TTDP unit 20, and thereby comes to hold the TND table with the same contents.

The NAT unit 30 includes an NAT translation table that records information for performing address translation from an ECN-side address into an ETB-side address and from an ETB-side address into an ECN-side address. The address generation unit 12 of the routing entry update unit 10 refers to the NAT translation table when it performs address generation.

The OS unit 40 controls the operation of the TBN 1. The OS unit 40 includes an IP unit 41 having a routing table 42 to be used for performing a packet transfer process. The routing table 42 is a table in which there is registered information, in accordance with a destination address of a packet to be transferred, about a next hop address indicating the next TBN and about an IP port indicating the IP port from which the packet is to be output.

The Ethernet driver unit 50 controls Ethernet communication with another TBN and with a subnet connected to the TBN 1 of its own apparatus.

Figure 3:
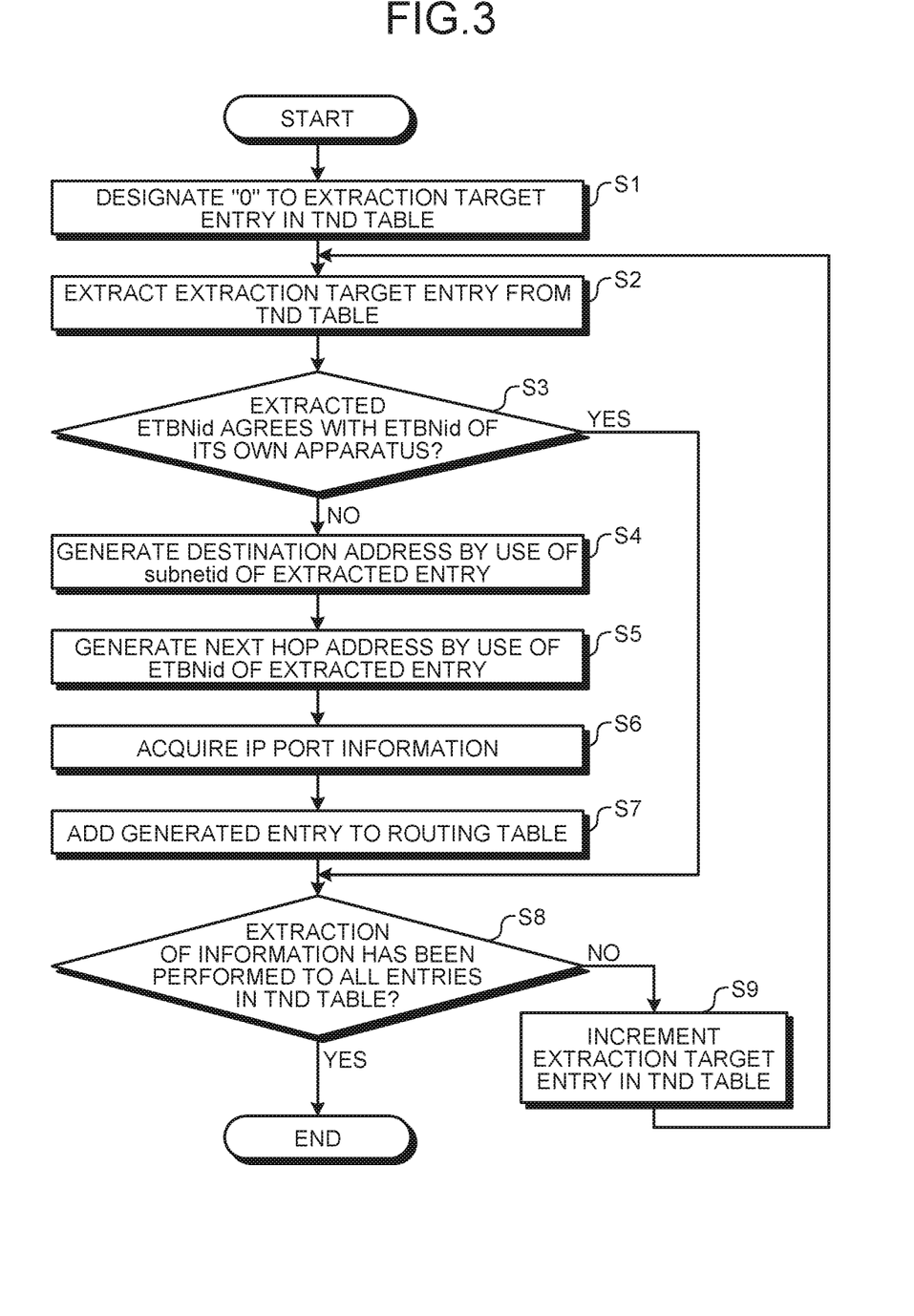
FIG. 3 is a flow chart illustrating a routing table update method for a TBN.

Next, an explanation will be given of a process of updating the routing table 42, which is performed by the routing entry update unit 10 when the TBN 1 is merged with the other TBNs 2 and 3. FIG. 3 is a flow chart illustrating a routing table update method for the TBN 1. At first, in the TBN 1, the entry extraction unit 11 of the routing entry update unit 10 designates the extraction target entry to be extracted from the TND table 21 as "0" (step S1), and the entry extraction unit 11 refers to the TND table 21 of the TTDP unit 20, and extracts the information of the entry 0 as the extraction target of this entry (step S2).

Figure 4:
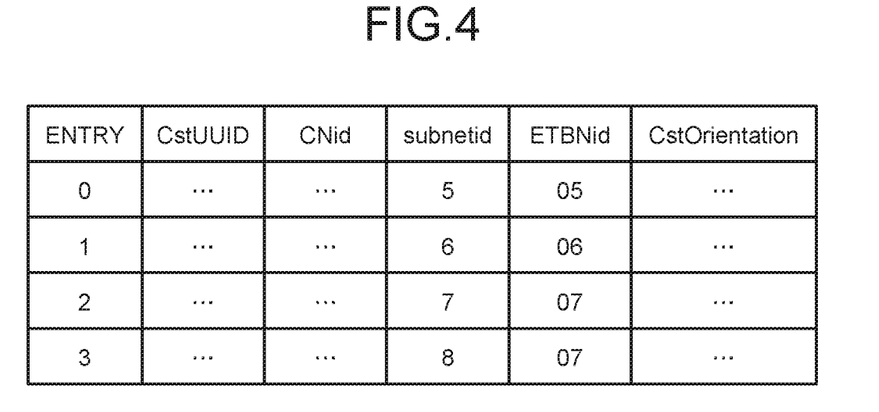
FIG. 4 is a view illustrating a configuration example of a TND table.

FIG. 4 is a view illustrating a configuration example of the TND table 21. The TND table 21 records information about such as CstUUID, CNid, subnetid, ETBNid, and CstOrientation for each of the entries. Of the information about them, the present embodiment utilizes information about subnetid and ETBNid. Each of the entries shows the relation between a TBN having an ETBNid described in this entry and a subnet connected thereto.

The entry extraction unit 11 confirms whether the ETBNid, among the extracted entry information, agrees with the ETBNid indicating of its own apparatus (step S3). As described previously, after merger, each of the TBNs holds the TND table 21 having the same contents. Accordingly, the TND table 21 includes contents about its own apparatus. Thus, in the entry extraction unit 11, there is no need to update the routing table 42 in terms of an entry corresponding to its own apparatus, and so such an entry is excluded from the objects of the update process. When the entry extraction unit 11 refers to ETBNid=05 of the entry 0, it confirms that this ETBNid agrees with the ETBNid of its own apparatus (step S3: Yes). Accordingly, the entry extraction unit 11 shifts directly to a step S8 by omitting the processes of steps S4 to S7. Then, if extraction of information has not yet been performed to all the entries in the TND table 21 (step S8: No), the entry extraction unit 11 increments the extraction target entry to be extracted from the TND table 21 (step S9). Specifically, the entry extraction unit 11 switches the extraction target entry from "0" to "1", and returns to the step S2.

The entry extraction unit 11 refers to the TND table 21 of the TTDP unit 20, and extracts the information of the entry as the extraction target of this entry (step S2). The entry extraction unit 11 confirms whether the ETBNid, among the extracted entry information, agrees with the ETBNid indicating its own apparatus (step S3). When the entry extraction unit 11 refers to ETBNid=06 in the entry 1, and confirms that this ETBNid disagrees with the ETBNid of its own apparatus (step S3: No). The entry extraction unit 11 sends the extracted entry information to the address generation unit 12.

Then, upon reception of the entry information from the entry extraction unit 11, the address generation unit 12 generates a destination address (step S4) by use of information about subnetid which is subnet identification information, among the information of the entry 1 extracted by the entry extraction unit 11. Specifically, the address generation unit 12 refers to the NAT table of the NAT unit 30, and processes the following address (1) by inserting "000110" into portions indicated with "s" at six digits of the following address (2), so as to obtain the following address (3). Here, the address (1) corresponds to an ETB-side address "10.128.0.0/18" expressed with binary numbers. The "000110" corresponds to the "subnetid=6" expressed with a binary number.

(1) 00001010.10000000.00000000.00000000/18
(2) 00001010.1000ssss.ss000000.00000000/18
(3) 00001010.10000001.10000000.00000000/18

The address generation unit 12 uses "10.129.128.0/18", which corresponds to the above address (3) converted into decimal numbers, as a destination address for the entry 1.

Then, the address generation unit 12 generates a next hop address (step S5) by use of information about ETBNid=06, which is TBN (communication apparatus) identification information, among the information of the entry 1 extracted by the entry extraction unit 11. Specifically, the address generation unit 12 refers to the NAT table of the NAT unit 30, and processes the above address (1) by inserting "000110" into portions indicated with "t" at six digits of the following address (4), so as to obtain the following address (5). Here, the "000110" corresponds to the "ETBNid=06" expressed with a binary number.

(4) 00001010.10000000.00000000.00tttttt/18
(5) 00001010.10000000.00000000.00000110/18

The address generation unit 12 makes "10.128.0.6/18", which corresponds to the above address (5) converted into decimal numbers, a next hop address for the entry 1.

Then, based on information about IP ports managed by the OS unit 40, the IP port information acquisition unit 13 acquires information about an IP port from the OS unit 40 (step S6), such that this IP port is one connected to the TBN corresponding to the next hop address "10.128.0.6/18" generated by the address generation unit 12. As illustrated in FIG. 1, each of the TBNs 1 to 3 is connected to the other TBNs via the IP port #1, and so the IP port information acquisition unit 13 acquires information about the IF port #1.

Then, the entry addition unit 14 forms one entry by use of information about the destination address and the next hop address generated by the address generation unit 12, and information about the IP port acquired by the IP port information acquisition unit 13, and adds the information of this entry to the routing table 42 (step S7).

Figure 5:
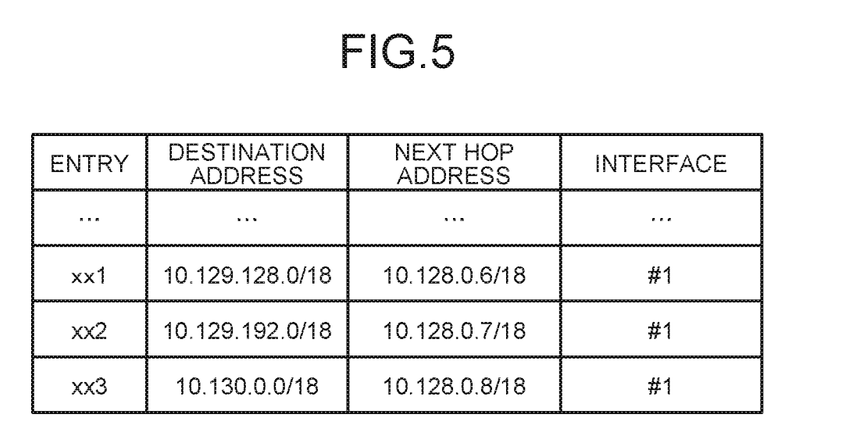
FIG. 5 is a view illustrating a configuration example of a routing table.

FIG. 5 is a view illustrating a configuration example of the routing table 42. The routing table 42 registers information about a destination address, a next hop address, and an interface, for each entry. Specifically, the entry addition unit 14 adds (registers) information into the routing table 42, such that an entry "xx1" is filled with "10.129.128.0/18" as a destination address, with "10.128.0.6/18" as a next hop address, and with "#1" indicating the IP port #1 as an interface.

The routing entry update unit 10 performs the above process of updating the routing table, until the extraction of information has been performed to all the entries in the TND table 21. If it has not yet been performed (step S8: No), the entry extraction unit 11 increments the extraction target entry to be extracted from the TND table 21 (step S0), as described above, and returns to the step S2. On the other hand, if the extraction of information has been performed to all the entries (step S8: Yes), the routing entry update unit 10 ends the process of updating the routing table 42.

The routing entry update unit 10 performs the process of updating the routing table 42 with respect to the entries 0 to 3 in the TND table 21 illustrated in FIG. 4. Consequently, as illustrated in FIG. 5, in addition to the registered entry information, the routing table 42 may include information about an entry "xx1" corresponding to the entry 1 in the TND table 21, an entry "xx2" corresponding to the entry 2 in the TND table 21, and an entry "xx3" corresponding to the entry 3 in the TND table 21.

Here, in the present embodiment, the routing entry update unit 10 includes: the configuration for extracting an entry in the TND table 21; the configuration for generating a destination address and a next hop address; the configuration for acquiring information about an IF port; and the configuration for adding an entry to the routing table 42, which are respectively and individually formed, but this is a mere example and not limiting. For example, the configuration for generating an address and the configuration for adding an entry to the routing table 42 may be formed as one configuration.

As described above, according to this embodiment, in a TBN that is a communication apparatus for constituting a car integrated management system, when a merger for a train formation is performed, a TCMS is used by: extracting information of an entry from a TND table; generating a destination address and a next hop address by use of information described in the entry thus extracted; further acquiring information about an IF port corresponding to the next hop address; and adding information about the destination address, the next hop address, and the IF port, as an entry, to a routing table. Consequently, the TBN can update the routing table of the ETBN by a simple process.

INDUSTRIAL APPLICABILITY

As described above, the communication apparatus, the car integrated management system, and the routing table update method according to the present invention are useful for communication in a train formation, and are particularly suitable for a merger for a train formation.

REFERENCE SIGNS LIST

1, 2, 3 TBN (communication apparatus), 4, 5, 6 subnet, 10 routing entry update unit, 11 entry extraction unit, 12 address generation unit, 13 IP port information acquisition unit, 14 entry addition unit, 20 TTDP unit, 21 TND table, 30 NAT unit, 40 OS unit, 41 IP unit, 42 routing table, 50 Ethernet driver unit.

The invention claimed is:

1. A communication apparatus for a car integrated management system including a plurality of communication apparatuses connected to each other, each of the plurality of communication apparatuses being associated with a respective car or train formation, the communication apparatus comprising:

a processor configured to:
in response to the communication apparatus being merged with other communication apparatuses, of the plurality of communication apparatuses, as a result of merger of the car or train formation associated with the communication apparatus with the car or train formation associated with the other communication apparatuses, merge a plurality of TND (Train Network Delivery) tables associated with the communication apparatus and the other communication apparatuses to form a merged TND table; and
update a routing table for the communication apparatus by:
evaluating each entry of the merged TND table, wherein entries associated with the communication apparatus are maintained separate from the routing table;
based on the evaluation of one or more entries of the merged TND table, generating a destination address as a delivery destination of a packet by use of a subnet identifier for identifying a subnet of a plurality of subnets, wherein each subnet is specific to a single respective car or train formation, wherein the destination address is different from an address for any of the plurality of communication apparatuses; and
adding information about the destination address to the routing table.

2. A communication apparatus for a car integrated management system including a plurality of communication apparatuses connected to each other, the communication apparatus comprising:
a processor configured to:
in response to the communication apparatus being merged with other communication apparatuses, of the plurality of communication apparatuses, as a result of merger of the car or train formation associated with the communication apparatus with the car or train formation associated with the other communication apparatuses,
merge a plurality of TND (Train Network Delivery) tables associated with the communication apparatus and the other communication apparatuses to form a merged TND table; and
update a routing table for the communication apparatus by:
evaluating each entry of the merged TND table, wherein entries associated with the communication apparatus are maintained separate from the routing table;
based on the evaluation of one or more entries of the merged TND table, generating a destination address as a delivery destination of a packet by use of a subnet identifier for identifying a subnet of a plurality of subnets, wherein each subnet is specific to a single respective car or train formation, wherein the destination address is different from an address for any of the plurality of communication apparatuses;
generating a next hop address that indicates an address of a transfer destination communication apparatus to which the packet is to be transferred from its own apparatus, based on communication apparatus identification information and an address translation table for translating Ethernet train backbones addresses to Ethernet Consist Network addresses; and
adding the destination address and the next hop address to the routing table.

3. The communication apparatus according to claim 2, wherein the processor is further configured to:
refer to information of entry from the merged TND table, wherein
the subnet identifier is included in the information of entry.

4. The communication apparatus according to claim 3, wherein the processor is further configured to:
acquire information about an IP (Internet Protocol) port to be used for sending the packet to the communication apparatus at the next hop address.

5. The communication apparatus according to claim 4, wherein the processor is further configured to:
add the information about the IP port to the routing table.

6. A car integrated management system to which a plurality of communication apparatuses according to claim 1 are connected.

7. A car integrated management system to which a plurality of communication apparatuses according to claim 2 are connected.

8. A car integrated management system to which a plurality of communication apparatuses according to claim 5 are connected.

9. A routing table update method in a communication apparatus for a car integrated management system including a plurality of communication apparatuses connected to each other, each of the plurality of communication apparatuses being associated with a respective car or train formation, the method comprising:
in response to the communication apparatus being merged with other communication apparatuses, of the plurality of communication apparatuses, as a result of merger of the car or train formation associated with the communication apparatus with the car or train formation associated with the other communication apparatuses,
merging a plurality of TND (Train Network Delivery) tables associated with the communication apparatus and the other communication apparatuses to form a merged TND table; and
updating a routing table for the communication apparatus by:
evaluating each entry of the merged TND table, wherein entries associated with the communication apparatus are maintained separate from the routing table;
based on the evaluation of one or more entries of the merged TND table, generating a destination address as a delivery destination of a packet by use of a subnet identifier for identifying a subnet of a plurality of subnets, wherein each subnet is specific to a single respective car or train formation, wherein the destination address is different from an address for any of the plurality of communication apparatuses; and
adding information about the destination address to the routing table.

10. A routing table update method in a communication apparatus for a car integrated management system including a plurality of communication apparatuses connected to each other, the method comprising:
in response to the communication apparatus being merged with other communication apparatuses, of the plurality of communication apparatuses, as a result of merger of the car or train formation associated with the communication apparatus with the car or train formation associated with the other communication apparatuses,
merging a plurality of TND (Train Network Delivery) tables associated with the communication apparatus and the other communication apparatuses to form a merged TND table; and
updating a routing table for the communication apparatus by:
evaluating each entry of the merged TND table, wherein entries associated with the communication apparatus are maintained separate from the routing table;
based on the evaluation of one or more entries of the merged TND table, generating a destination address as a delivery destination of a packet by use of a subnet identifier for identifying a subnet of a plurality of subnets, wherein each subnet is specific to a single respective car or train formation, wherein the destination address is different from an address for any of the plurality of communication apparatuses;
generating a next hop address that indicates an address of a transfer destination communication apparatus to which the packet is to be transferred from its own apparatus, based on communication apparatus identification information and an address translation table for translating Ethernet train backbones addresses to Ethernet Consist Network addresses; and adding the destination address and the next hop address to the routing table.

11. The routing table update method according to claim 10, further comprising:
referring to information of entry from the merged TND table, wherein
the subnet identifier is included in the entry information.

12. The routing table update method according to claim 11, further comprising:
acquiring information about an IP (Internet Protocol) port to be used for sending the packet to the communication apparatus at the next hop address.

13. The routing table update method according to claim 12, further comprising:
adding the information about the IP port to the routing table.

14. A communication apparatus for a car integrated management system including a plurality of communication apparatuses connected to each other, each of the plurality of communication apparatuses being associated with a respective car or train formation, the communication apparatuses comprising:
a node configured to:
in response to the communication apparatus being merged with other communication apparatuses, of the plurality of communication apparatuses, as a result of merger of the car or train formation associated with the communication apparatus with the car or train formation associated with the other communication apparatuses,
merge a plurality of TND (Train Network Delivery) tables associated with the communication apparatus and the other communication apparatuses to form a merged TND table; and
update a routing table for the communication apparatus by:
evaluating each entry of the merged TND table, wherein entries associated with the communication apparatus are maintained separate from the routing table;
based on the evaluation of one or more entries of the merged TND table, generating a destination address as a delivery destination of a packet, by use of a subnet identifier to identify a subnet of a plurality of subnets, wherein each subnet is connected to the respective communication apparatuses and is specific to a single respective car or train formation, wherein the destination address is different from an address for any of the plurality of communication apparatuses; and
adding information about the destination address to the routing table.

15. A communication apparatus for a car integrated management system including a plurality of communication apparatuses connected to each other, the communication apparatus comprising:
a node configured to:
in response to the communication apparatus being merged with other communication apparatuses, of the plurality of communication apparatuses, as a result of merger of the car or train formation associated with the communication apparatus with the car or train formation associated with the other communication apparatuses,
merge a plurality of TND (Train Network Delivery) tables associated with the communication apparatus and the other communication apparatuses to form a merged TND table; and
update a routing table for the communication apparatus by:
evaluating each entry of the merged TND table, wherein entries associated with the communication apparatus are maintained separate from the routing table;
based on the evaluation of one or more entries of the merged TND table, generating a destination address as a delivery destination of a packet, by use of a subnet identifier to identify a subnet of a plurality of subnets, wherein each subnet is connected to the respective communication apparatuses and is specific to a single respective car or train formation, wherein the destination address is different from an address for any of the plurality of communication apparatuses;
generating a next hop address that indicates an address of a transfer destination of the communication apparatus to which the packet is to be transferred from its own apparatus, based on communication apparatus identification information and an address translation table for translating Ethernet train backbones addresses to Ethernet Consist Network addresses; and
adding the destination address and the next hop address to a routing table.

16. The communication apparatus according to claim 14, wherein the node is further configured to refer to information of entry from the merged TND table, and
the subnet identifier is included in the entry information.

17. The communication apparatus according to claim 15, wherein the node is further configured to refer to information of entry from the merged TND table, and
the subnet identifier is included in the entry information.

18. The communication apparatus according to claim 14, wherein the node is further configured to:
generate a next hop address that indicates an address of a transfer destination of the communication apparatus to which the packet is to be transferred from its own apparatus, based on communication apparatus identification information and an address translation table; and
acquire information about an IP (Internet Protocol) port to be used for sending the packet to the communication apparatus at the next hop address.

19. The communication apparatus according to claim 15, wherein the node is further configured to acquire information about an IP (Internet Protocol) port to be used for sending the packet to the communication apparatus at the next hop address.

20. The communication apparatus according to claim 17, wherein the node is further configured to acquire information about an IP (Internet Protocol) port to be used for sending the packet to the communication apparatus at the next hop address.

21. The communication apparatus according to claim 20, wherein the node is further configured to:
add the information about the IP port to the routing table.

22. A car integrated management system to which a plurality of communication apparatuses according to claim 14 are connected.

23. A car integrated management system to which a plurality of communication apparatuses according to claim 15 are connected.

24. A car integrated management system to which a plurality of communication apparatuses according to claim 21 are connected.

* * * * *